Jan. 1, 1957  J. P. TERRETT  2,776,120
MIXING DEVICE
Filed April 15, 1954   3 Sheets-Sheet 1

INVENTOR.
JOHN P. TERRETT
BY
ATTORNEY

Jan. 1, 1957 J. P. TERRETT 2,776,120
MIXING DEVICE

Filed April 15, 1954 3 Sheets-Sheet 2

INVENTOR.
JOHN P. TERRETT
BY
ATTORNEY

Jan. 1, 1957 J. P. TERRETT 2,776,120
MIXING DEVICE
Filed April 15, 1954 3 Sheets-Sheet 3
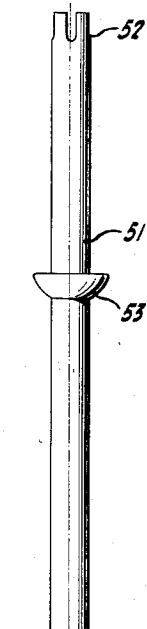
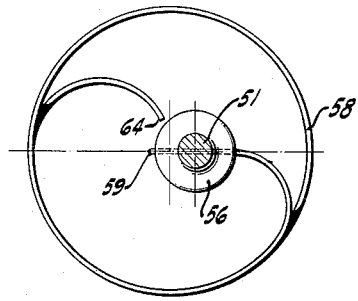
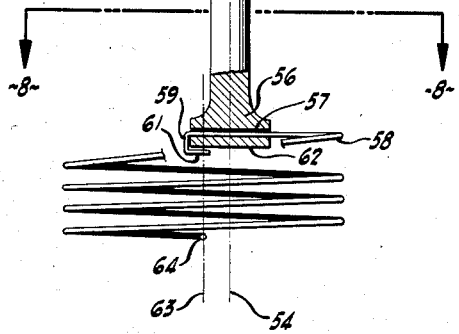
INVENTOR.
JOHN P. TERRETT
BY
ATTORNEY United States Patent Office 2,776,120
Patented Jan. 1, 1957

2,776,120

MIXING DEVICE

John P. Terrett, San Francisco, Calif.

Application April 15, 1954, Serial No. 423,283

4 Claims. (Cl. 259—72)

My invention relates to means especially useful to provide a homogeneous mixture of various ingredients usually in relatively small quantities; for example, quantities designed for individual consumption.

While the use of the device is by no means limited thereto, there is quite a chore involved in reconstituting milk powder, for example. This involves the mixture of water with milk powder in a container. Considerable agitation is required so that the powder and water form a homogeneous, well mixed product. Any mixer for that and similar purposes is necessarily judged by its effectiveness, the amount of labor involved in utilizing it, its sanitary characteristics, its ease of use and its cost to manufacture, as well as by other factors.

Some mixing devices have certain disadvantages in that they have cracks or crevices from which lodged material can be dislodged only with difficulty, or tend to leave partially dampened powder on the container walls without thorough admixture, or are too expensive for normal use, or have a characteristic of whipping an undue amount of air into the product or require more labor than is reasonable.

It is therefore an object of my invention to provide a mixer satisfying all of the requirements indicated above and not subject to any of the indicated disadvantages.

Another object of my invention is to provide in general an improved mixing device.

A still further object of my invention is to provide a mixing device effective for use especially with milk powder packed in a container having a removable lid.

Another object of my invention is to provide a mixing device easy to use, economical, effective to produce the desired result and useful in any of various different containers.

A still further object of the invention is to provide a mixing device useful in doing all sorts of mixing.

An additional object of the invention is to provide a mixing device operable by hand or, in an adaptation, operable by power.

While the mixing device of my invention is by no means limited to the mixing of milk powder, it is usefully employed for that purpose and its description herein in that connection is intended as an example rather than as a limitation. Also, the mixing device can be embodied in a number of different forms, the forms illustrated herein being some which are commercially and practically effective.

In attaining the objects of the invention, the structure may be embodied in one of the forms described in the accompanying description and illustrated in the accompanying drawings, in which:

Figure 7 is a side elevation, a portion being broken away in diametrical cross-section, of a further modified form of mixing device pursuant to the invention.

Figure 8 is a cross-section, the plane of which is indicated by the line 8—8 of Figure 7.

Figure 1:
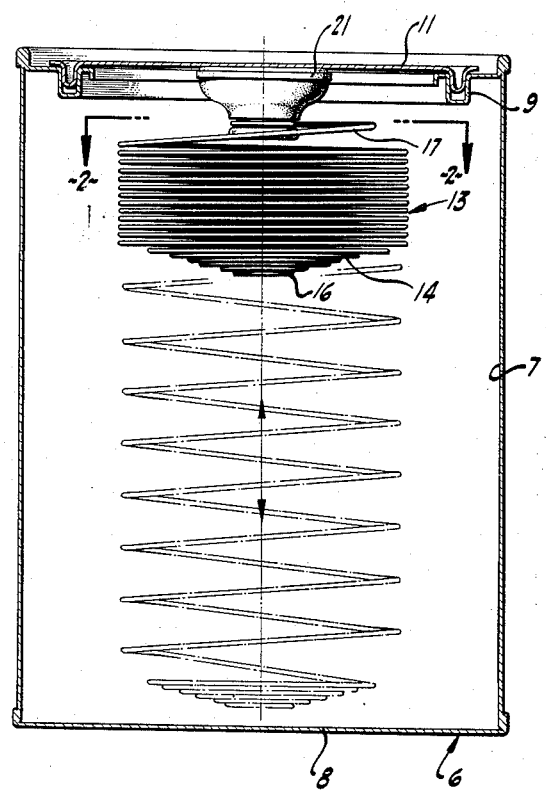
Figure 1 is a cross-section on an axial plane through a container having a lid to which the mixing device of the invention is attached in operating location.
Figure 2:
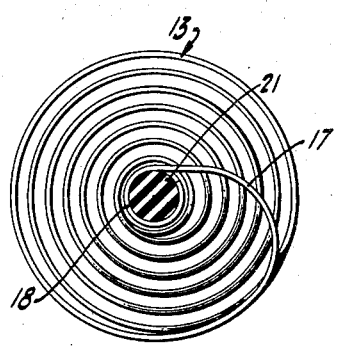
Figure 2 is a cross-section, the plane of which is indicated by the line 2—2 of Figure 1.
Figure 3:
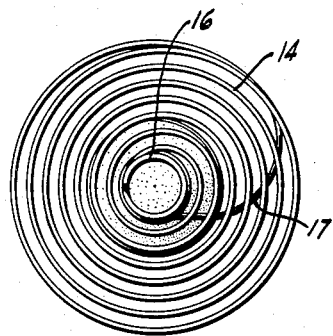
Figure 3 is a view from below of the structure shown in Figure 1.

In the embodiment especially shown in Figures 1, 2 and 3, there is utilized a standard container 6 for material to be mixed, such as powdered milk. The container is a circular cylindrical body 7 having a bottom end 8 and an inturned flanged rim 9 to which a removable lid 11 is secured by frictional engagement in the customary way. The particular shape of the container 6 is standard and forms no part of the present invention. The container is normally supplied with a quantity of material to be mixed, such as powdered milk, and when the lid 11 is assembled on the body flange 9 a liquid tight enclosure is provided.

In accordance with my invention, I provide a mixing device within the container 6 and secured to the lid 11 thereof. This mixing device includes a wire helix 13 formed of metal wire of relatively small diameter (.041 inch). The wire is wound to provide a regular helix of a uniform diameter approximately half to two-thirds the interior diameter of the can body 7. In its normal relaxed condition, the turns or convolutions of the helix 13 are relatively close to each other. The relaxed or inactive axial height of the uniform turns of the helix 13 is about a fifth of the axial height of the can or container 6.

Adjacent one end, the round wire of the helix is convoluted to form an approximate spiral 14, especially as shown in Figure 3, with the convolutions of the spiral approximately co-planar and spaced apart a distance several times the diameter of the round wire. The number of turns in the spiral 14 and the form is such that the spiral terminates in an approximately circular end 16 substantially concentric with the axis of the can 7 so that the mass of the spiral 14, considered as a unit, is relatively great.

Adjacent its other end, the helix 13 is deformed to provide an arm 17 having an abrupt transition from the marginal circle of the helix so that as nearly as possible the arm 17 abruptly crosses the helix and extends toward the center, whereat it terminates in a substantially circular loop 18. The arm 17 is also axially spaced from the adjacent convolutions of the helix 13 somewhat more than the convolutions are spaced from each other.

The loop 18 is utilized as a fastening for a device for securing the helix 13 in location within the container 6. As a securing means, there is provided a vacuum cup 21, preferably constituted of rubber or a rubber equivalent, having approximately the cross-sectional shape shown in Figure 4. The cup is arranged with its axis approximately coincident with the axis of the container body 7, likewise establishing a coaxial relationship between the helix 13 and the container 6. The material of the vacuum cup 21 is sufficiently soft and elastic so that it serves partly as a resilient mounting as well as a gripping device attached to the lower surface of the lid 11.

With this relationship of the parts, the container 6 when approximately filled with milk powder and with water is sealed by positioning of the lid 11 after the vacuum cup 21 has been mounted thereon, as shown in Figure 1.

Thereafter, the user shakes the container 6. The shaking movement can be largely in the direction of the axis of the container and is effective to impart an acceleration to the material of the helix 13 and especially to the material of the spiral 14. Since a good deal of weight is concentrated in the spiral, the end of the helix moves from its relaxed position, as shown in the full lines in Figure 1, to an extended position approximately as illustrated in the dotted line positions in Figure 1. The mixer coils thus traverse substantially the entire length of the interior of the container and return. As the helix extends, its diameter lessens so that both longitudinal and transverse mixing is accomplished. During this rapid, alternate extension and retraction, the convolutions of the helix may "bottom" or abut one another at various points along the helix as pressure waves travel along the helix. Some of the operating force is transmitted to the rubber vacuum cup 21 which, being elastic, springs back and returns much of the energy to the helix so that in the next cycle the helix extends to a substantial degree, as illustrated.

This mixing action is facilitated by the relatively small diameter of the wire so that the wire cuts or moves easily through the material within the container, and is not seriously damped in its vibration but is free to shake axially and also laterally to a considerable extent. The wire shape moves and vibrates rather freely throughout practically the entire interior of the shaken container on various compelx motion paths. In the event the relatively heavy spiral 14 is extended far enough to strike the bottom 8 of the container, it rebounds therefrom and makes a sound indicating that the shaking is sufficient for a full stroke. The helix is sufficiently free and is of such a size and is so convoluted at both ends as to agitate the entire contents of the container without permitting any sticking to the walls of the container yet without having any entanglement of the wire device upon itself. This is especially because the arm 17 crosses the helix turns quite abruptly and because the coils of the spiral 14 are far enough apart not to interengage.

The oscillation of the stirring helix is due, it is believed, not only to the acceleration of the parts of the helix, particularly the heavy spiral lower end thereof, but also is due partly to transfer of momentum from one turn of the helix to the next when the turns contact each other. The net result, as shown by laboratory tests and in actual practice, is the production of a thoroughly mixed product of proper consistency without excess aeration, without dry or semi-dry particles adhering to the container walls, and without the utilization of much force.

When the contents of the container have been sufficiently agitated and mixed, the lid 11 is removed and the contents can be discharged. It will be found that there is substantially no aeration of the product since the thin wire does not whip up bubbles of a long-lasting size. The device can be immediately cleaned by simple washing, either while it is attached to the lid 11 or after it has been detached. There are no cracks or crevices within which material can be lodged and the entire assembly is easily prepared for re-use by ordinary washing.

The device is usually constituted of metal wire, and can then be sterilized at a very high temperature if that becomes desirable. On the other hand, if the wire is of plastic material, particularly a thermo-plastic, it may not be feasible to use as high a sterilizing temperature, although hot water washing does not produce any difficulty.

Figure 4:
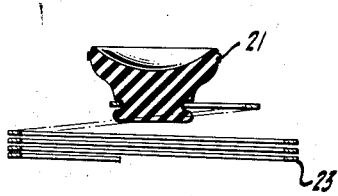
Figure 4 is a cross-section on an axial plane of a part of a modified form of mixing device in accordance with my invention.

The modification of Figure 4 is substantially the same as described except that the wire 23 is rectangular in cross-section, the widest dimension of the rectangle being transverse to the main direction of oscillation so that considerable additional eddying and localized mixing is produced. It happens that a helix of rectangular wire as shown in Figure 4 is harder to wind and is somewhat more expensive than one of round wire, although its mixing is more effective if heavy eddies are necessary. There is a disadvantage, however, in that the flat material does not cut through relatively thick matter as well as the round wire of Figures 1, 2 and 3. However, the transfer of momentum from one helical turn to the other is a characteristic of the Figure 4 device as well as that of the preceding device and the resiliency and effect of the mounting cup 21 is the same.

Figure 5:
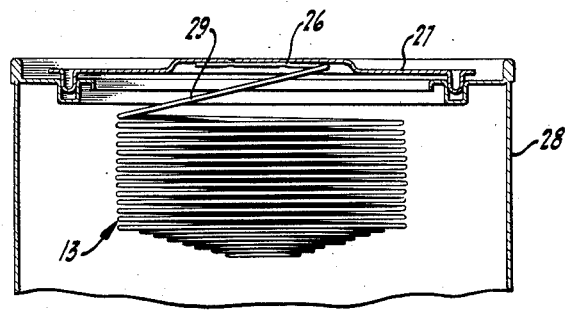
Figure 5 is a fragmentary view in cross-section something like Figure 1 but showing a further modified form of mixing device pursuant to my invention.

In the form of the device shown in Figure 5, the elastic attaching cup is replaced by a spot welded connection 26 to the lid 27 of a container 28, the arm 29 being deformed somewhat more in this instance in order to afford a greater resiliency. The structure otherwise is substantially as previously described but is intended primarily as a permanent installation to come with the container of powdered material and so that it is always available for mixing. The device of Figure 5 can be re-used by substituting the lid 27 for a similar lid on a comparable container or, the device being sufficiently cheap, can be thrown away with the container when the contents are exhausted.

Figure 6:
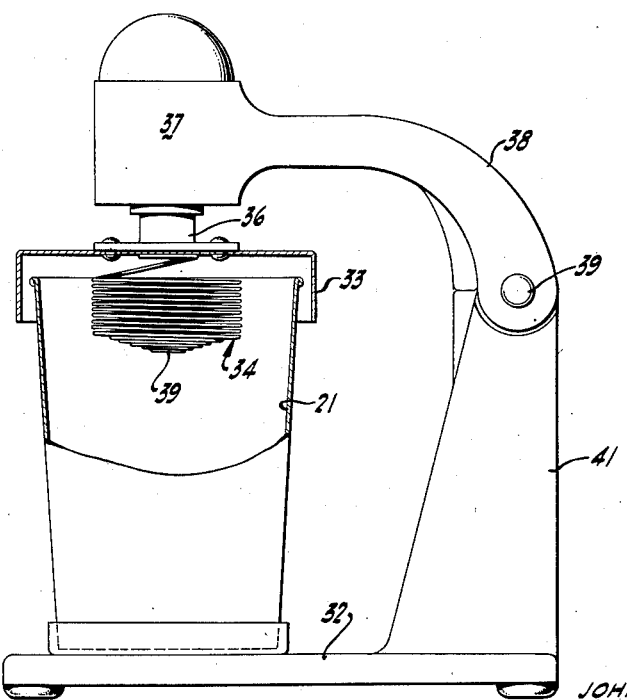
Figure 6 is a side elevation, parts being broken away to show the interior in cross-section, of a modified form of mixing device pursuant to my invention.

In Figure 6, there is shown a somewhat different version in which the shaking is not accomplished manually. In this instance, a container 31 is mounted on an appropriate base 32 and is provided with a very loose fitting cover 33. To the cover there is attached a mixing device 34 illustrated as being comparable to that in Figure 5 but effectively also being of the sort shown in Figures 1 or 4. The cover 33 is not directly in contact with the container, but rather is permanently mounted on a connector 36 extended from a vibrating device 37. This is on a movable stand 38 connected by a pivot 39 to a stand 41 on the base 32. In this instance, when the vibrator is energized, for example by electricity, the mixer 34 is agitated primarily by accelerations in the direction of its axis, which is substantially the same as the axis of the container 31. The mixing helix, together with its spiral 39, pass through the material within the container 31 thoroughly agitating it, and creating eddies and turbulence therein to provide a homogeneous final mixture.

In Figures 7 and 8 there is disclosed a still further modified form of the invention. In this instance, the mixing device is especially adapted for operation by means of a rotary shaft, the rotation being accomplished either by hand or by power, preferably the latter. Where a power driving element is available, I preferably provide a rotary shaft 51 having a jaw clutch 52 at one extremity thereof for engagement with a rotary driving element, not shown. A collar 53 around the shaft acts as a stop for the introduction of the clutch 52 into the driving instrumentality. The shaft 51 is designed for rotation about a central axis 54.

The lower end of the shaft 51 is provided with an enlargement 56 having a diametrically disposed cross bore 57 therethrough. Passing through the bore is a wire coil 58 of the general sort previously described and having one end 59 bent over the enlargement 56 and having an inturned portion 61 which is loosely arranged with respect to the lower face 62 of the enlargement 56 so that the coil 58 can rock within small limits in the bore 57, the rocking motion being a limited rotation of the wire in the bore 57. The wire coil 58 is continued to form a plurality of turns which are approximately circular in plan and centralized about an eccentric axis 63 some distance from the axis 54. The final turn of the coil is made up of a re-entrant portion 64 terminating approximately at the axis 63.

In the operation of this device, the shaft 51 is rapidly rotated with the coil 58 immersed or partially immersed in material to be mixed. As the shaft rotates, the eccentric coil 58 partakes of at least two main radial motions. The centrifugal force enlarges the diameter of the coil rather substantially and the coil as a whole partakes of an orbital motion about the axis 54. The unbalance of the coil due to the eccentric winding thereof is especially effective to induce other vibrations, both radially and especially axially, in the coil so that it elongates in an axial direction and unwinds and expands in a radial direction. With the usual mix container, the coil scrapes the sides of the container from time to time and prevents adherence of mixed material thereto. Furthermore, the coil has the property of discharging very little mixed material by centrifugal force so that any random particles are virtually never discharged from the mixing container.

When the mixing operation has been completed, the mixing element including the shaft 51 can readily be detached from the driving instrumentality and can readily be cleaned or sterilized. When the operation proceeds, the coil, being yielding or resilient, cannot cause any serious damage in the event a spoon or other implement is put into the mixing container along with the coil spring. This form of the invention therefore not only presents an improved performance, but is readily adapted to a rotary driving device for mixing.

What is claimed is:

1. A mixing device for use in a container having a removable lid comprising a wire helix, means formed at one end of said helix serving as a concentrated mass and including a wire spiral, a vacuum cup engageable with said lid, and means formed at the other end of said helix engaging said vacuum cup.

2. A mixing device comprising a wire helix of substantially uniform diameter, a wire spiral formed at one end of said helix, a wire arm formed at the other end of said helix, and a vacuum cup disposed on the axis of said helix and engaged by said wire arm.

3. A mixing device comprising a wire helix wound with substantially uniform convolutions when at rest spaced close to each other, spiral turns of said wire at one end of said helix forming a mass concentrated more closely than said uniform convolutions and effective when subjected to a substantial accelerating force to extend said entire helix, and means at the other end of said helix for anchoring said end against movement when subjected to said accelerating force.

4. A mixing device comprising a wire helix having a substantially uniform diameter, spiral turns of said wire at one end of said helix constituting a mass concentrated within said diameter, and means at the other end of said helix constituting a fastener disposed within said diameter.

References Cited in the file of this patent
UNITED STATES PATENTS

| 99,883 | Haines | Feb. 15, 1870 |
| 395,303 | Wuchner | Dec. 25, 1888 |
| 632,044 | Chapman | Aug. 29, 1899 |
| 1,060,419 | Benjamin | Apr. 29, 1913 |

FOREIGN PATENTS

| 10,287 | Great Britain | May 28, 1894 |